United States Patent

Gardner

[15] 3,638,962

[45] Feb. 1, 1972

[54] SUSPENSION SYSTEM FOR TANDEM AXLES OF AUTOMOTIVE VEHICLES

[72] Inventor: Edwin F. Gardner, 1228 West 8450 South, West Jordan, Utah 84084

[22] Filed: Sept. 8, 1969

[21] Appl. No.: 855,990

[52] U.S. Cl. ..................................................280/104.5 R
[51] Int. Cl. ......................................................B60g 19/02
[58] Field of Search ................................280/104.5, 104.5 A

[56] References Cited

UNITED STATES PATENTS

| | | | |
|---|---|---|---|
| 870,607 | 11/1907 | Amberg | 280/104.5 |
| 3,363,913 | 10/1965 | McFarland | 280/104.5 |
| 3,126,209 | 3/1964 | Jewell | 280/104.5 X |

*Primary Examiner*—Philip Goodman
*Attorney*—Mallinckrodt & Mallinckrodt, P. H. Mallinckrodt and Philip A. Mallinckrodt

[57] ABSTRACT

A superior riding suspension system for tandem axles of automotive vehicles, such as trucks, truck tractors, and trailers. Bellcranks are provided back-to-back between the axles, a set thereof being provided at each set of axle ends at opposite sides of the vehicle. The bellcranks are fulcrumed intermediate their lever arms to the frame of the vehicle, thereby individually suspending respective axles. Corresponding lever arms of the sets of bellcranks have their ends pivotally attached to the respective axle end portions; the other corresponding lever arms of the sets of bellcranks are coupled together for cooperative action and reaction, respectively. In this way the system provides for equalization of road shocks as well as a predetermined degree of self-steering. Either or both the coupling means and the coupled sets of corresponding arms have shock absorbing characteristics, so as to cushion road shocks.

10 Claims, 11 Drawing Figures

PATENTED FEB 1 1972

INVENTOR.
EDWIN F. GARDNER

BY Mallinckrodt and Mallinckrodt
ATTORNEYS

INVENTOR.
EDWIN F. GARDNER

BY Mallinckrodt and Mallinckrodt
ATTORNEYS

INVENTOR.
EDWIN F. GARDNER

BY Mallinckrodt and Mallinckrodt
ATTORNEYS

SUSPENSION SYSTEM FOR TANDEM AXLES OF AUTOMOTIVE VEHICLES

BACKGROUND OF THE INVENTION

1. Field

The invention is in the field of automotive vehicle suspensions, particularly those that provide for independent action of each wheel.

2. State of the Art

Tandem axles are commonly employed for trucks, truck tractors, and truck trailers that carry freight along highways and otherwise serve industry. Walking beam or solid beam types of suspension systems are commonly employed. These are relatively trouble-free from a mechanical standpoint, but suffer from "road hop" during use and are not self-steering, i.e., they do not enable the tandem axles to automatically adjust their relative positions when the vehicle is rounding curves to align the road wheels at opposite sides with the respective differential arcuate paths of travel required of them if there is to be no transverse drag and resulting abrasive wear on tires. Thus, unless the suspensions for such tandem axles are self-steering, there is considerable unnecessary tire wear. Most other suspensions in widespread use, e.g., torsion bar suspensions, are not self-steering even though they eliminate of minimize road hop. This is so for a variety of reasons, but primarily because few self-steering suspension systems combine simplicity and economy of construction with required ruggedness, freedom from maintenance, positivity of action, and dependability over long periods of use. Those few that do approach these desirable characteristics leave room for improvement in one or another of such characteristics, as well as in the cushioning of the ride.

OBJECTIVE

In the making of the present invention, it was a principal purpose to provide a suspension system having the desirable characteristics noted above to a maximum extent, along with independent cushioned suspension of the individual wheels to eliminate the usual road hop, vibration, and bounce, and along with self-steering to minimize tire wear.

SUMMARY OF THE INVENTION

The suspension system of the invention achieves the stated objective and provides a ride superior to present self-steering systems and to the less desirable suspension systems of walking beam or solid beam types that are not self-steering. Moreover, it enables the degree of self-steering to be predetermined for any given vehicle and the type of springing to be selected from a variety of known forms; in addition, it provides a low roll center.

In accordance with the invention, bellcranks are employed at respective end portions of the tandem axles and are mounted relative to the frame of the vehicle, the axles, and their respective corresponding lever arms to provide independent suspension for each set of wheels, yet equalization between the axles. Corresponding lever arms of sets of forwardly and rearwardly placed bellcranks are coupled, so that action in one causes reaction in the other and equalizes by forcing the corresponding rearward road wheel or wheels up when the corresponding forward road wheel or wheels go down and vice versa.

The presently preferred arrangement of the bellcranks is in pairs for each axle, with the bellcranks of each pair at opposite end portions of the axle and corresponding bellcranks of the pairs back-to-back between the tandem axles. As so arranged, one set of lever arms of each pair of bellcranks extends toward the corresponding axle and the other set extends upwardly. Correspondingly lever arms of this set from the two pairs of bellcranks disposed front and rear as they are at one or the other side of the vehicle, have end portions that confront each other and are coupled together so that one reacts when the other acts. Either the coupling or the coupled lever arms, or both, may be constructed to absorb shocks, e.g., may be a spring.

THE DRAWINGS

In the accompanying drawings, which illustrate constructions presently contemplated as the best mode of carrying out the invention:

DETAILED DESCRIPTION OF THE ILLUSTRATED EMBODIMENTS

Figure 1:
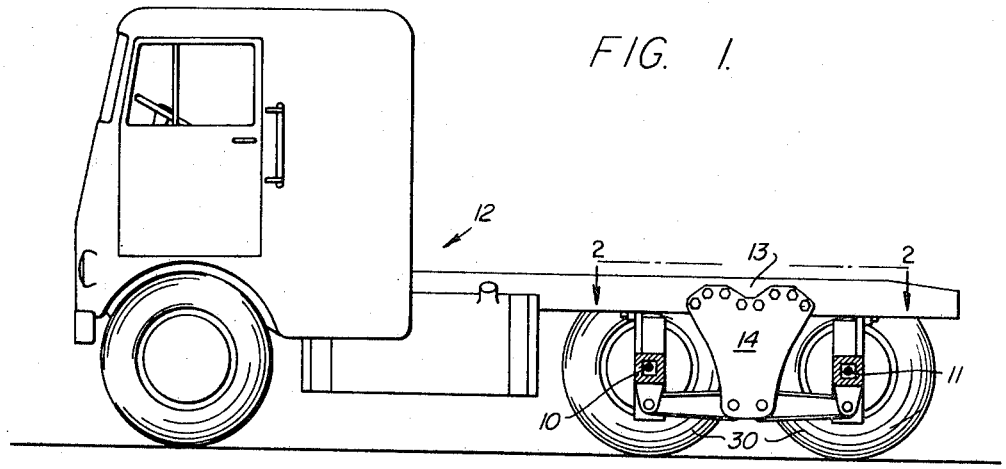
FIG. 1 represents, partly in side elevation and partly in vertical section taken on the line 1—1 of FIG. 2, a truck having tandem rear axles equipped with a preferred embodiment of the suspension system of the invention.
Figure 2:
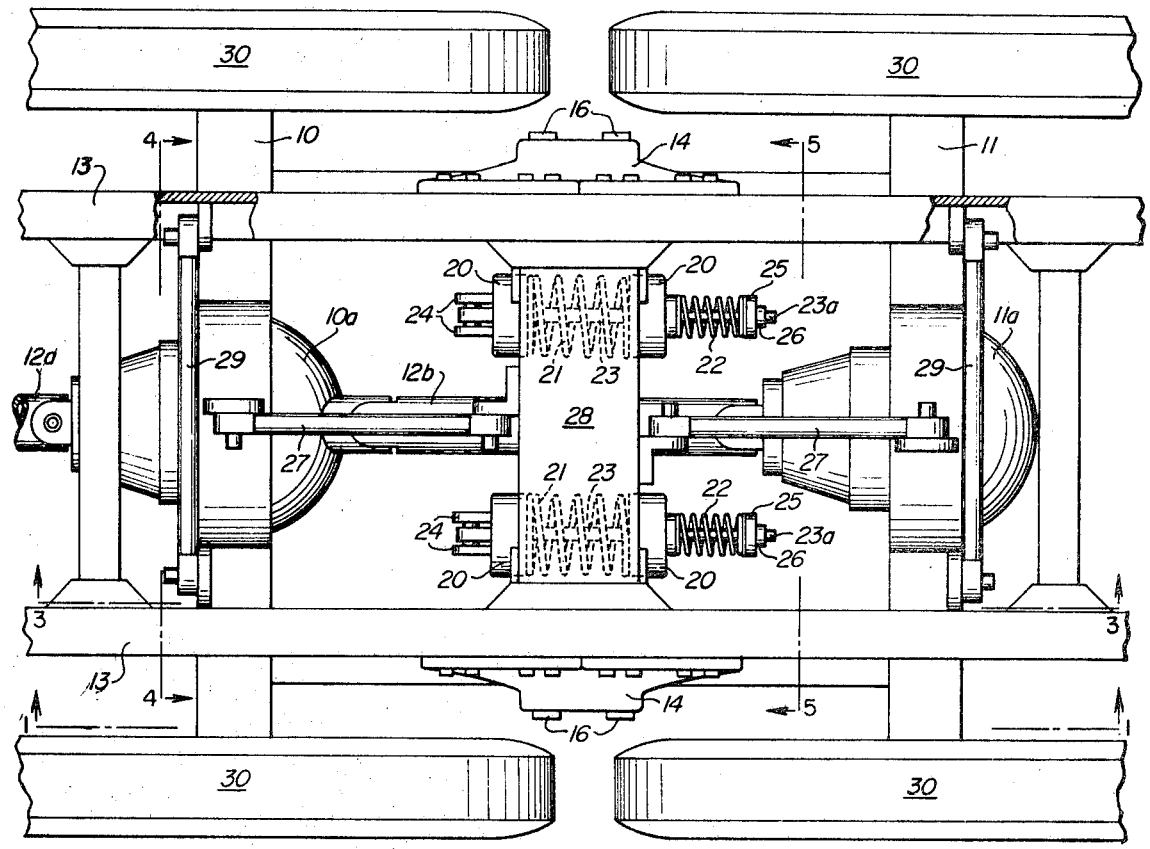
FIG. 2 is a considerably enlarged, fragmentary view in top plan taken on the line 2—2 of FIG. 1.
Figure 3:
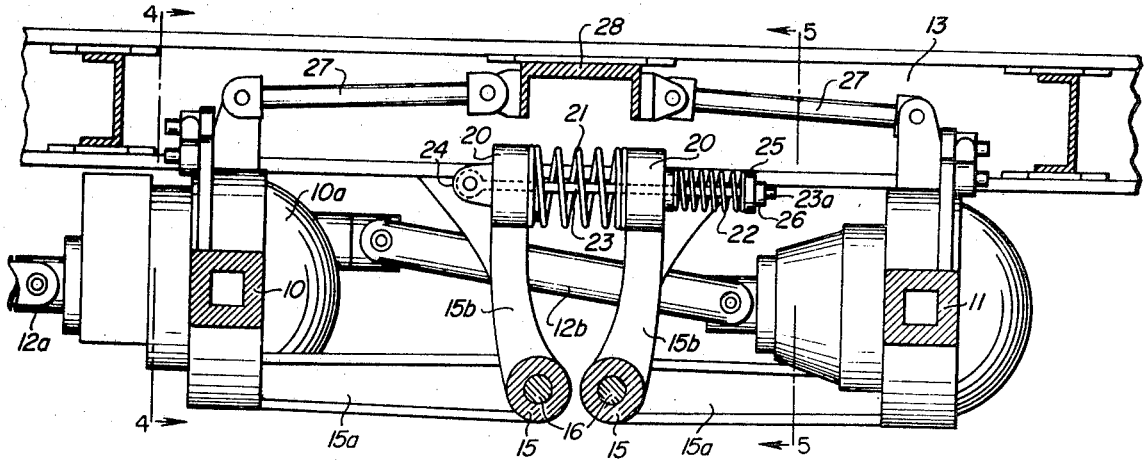
FIG. 3 is a fragmentary longitudinal vertical section taken on the line 3—3 of FIG. 2.

As shown in FIGS. 1-5, the stabilization system utilizes coil springs as resilient coupling means between corresponding bellcrank lever arms which are themselves rigid. The suspension is installed between tandem rear axles 10 and 11, respectively, of truck tractor 12 of FIG. 1, which is of usual construction, having a main drive shaft 12a, FIGS. 2 and 3, and an auxiliary drive shaft 12b connected in customary manner to the differentials 10a and 11a of the respective axles.

In its there illustrated form, the suspension is secured to longitudinal side rails 13 of the truck frame by means of respective dependent bracket plates 14 at respective opposite sides of the truck. It comprises a pair of bellcranks 15 for each of the axles 10 and 11, the individual bellcranks of each pair being mounted at respective opposite end portions of their corresponding axles, each being pivotally attached, i.e., fulcrumed, intermediate its lever arms 15a and 15b to the corresponding bracket plate 14, as by being journaled on a shaft 16, FIG. 5, preferably with rubber or other suitable bushing 17.

Figure 4:
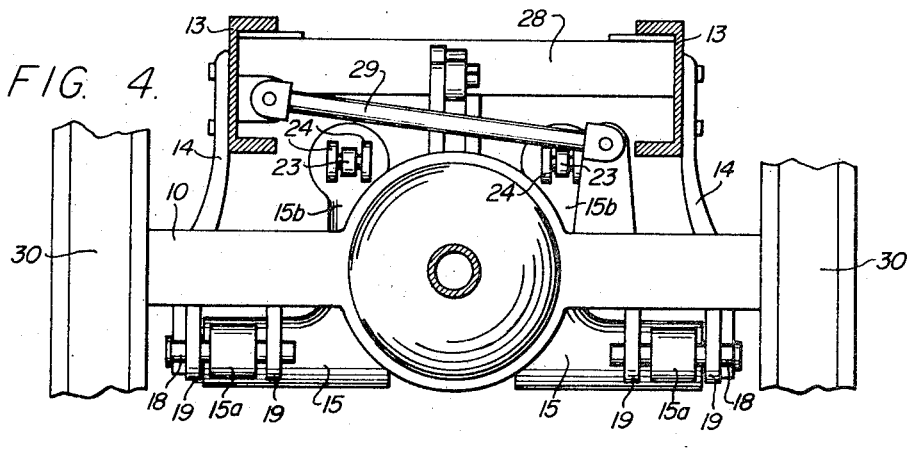
FIG. 4 is a fragmentary transverse vertical section taken on the line 4—4 of FIG. 2 or 3.
Figure 5:
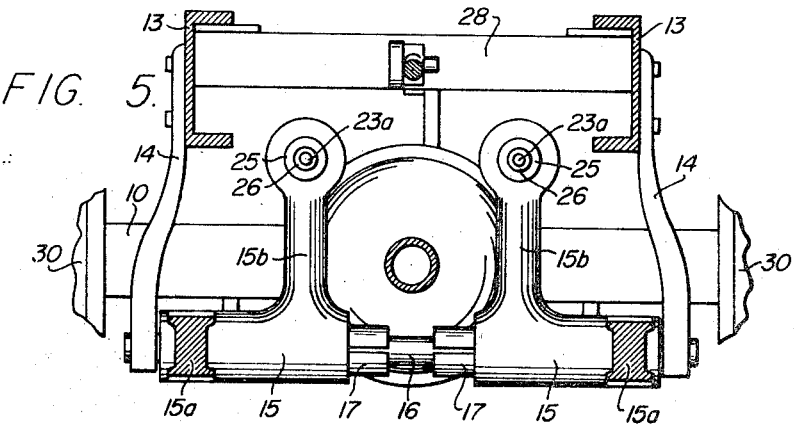
FIG. 5 is a similar view taken on the line 5—5 of FIG. 2 or 3.

One set of lever arms 15a of each pair of bellcranks 15 extend toward the corresponding axle 10 or 11, the individual lever arms thereof being pivotally secured thereto, as by means of respective pivot pins 18, FIG. 4, mounted in respective pairs of spaced ears 19 which rigidly depend from the axle. Rubber bushings (not shown) are advantageously also used here, so as to eliminate any need for lubricating the suspension. The other set of lever arms 15b of each pair extend upwardly and terminate in end portions 20 that confront similar end portions of the other pair, see FIG. 3.

The confronting ends 20 of the pairs of corresponding lever arms 15b at respective opposite sides of the truck 12 are coupled together, so that action of one of the lever arms of a pair will cause the other lever arm of such pair to react.

In accordance with the invention, each assembly of such a pair of corresponding bellcrank lever arms and the means that couple them together have shock-absorbing characteristics. In the present embodiment of FIGS. 1-5, the coupling means are resilient to provide such characteristics for the assembly. Thus, as illustrated, see particularly FIGS. 2 and 3, the confronting ends 20 of each pair of corresponding lever arms 15b are coupled by means of a main coil spring 21 and an auxiliary coil spring 22, the former being positioned between the lever arm confronting ends 20 and surrounding a guide rod 23 which is pivoted at one of its ends in an ear 24 projecting backwardly from one of such confronting ends 20, and the latter surrounding an extension 23a of such guide rod projecting freely through and backwardly from the opposite confronting end 20 for compression between such end and a washer 25 held by a nut 26.

Longitudinal torque rods 27 are preferably provided between the respective differentials 10a and 11a and an intermediate truck frame member 28 in the usual manner, and, similarly, tracking torque rods 29 are preferably provided between the respective truck frame rails 13 and the respective axles 10 and 11. The manner of supplying these usual structural components of a truck's undercarriage is incidental to the suspension system of the invention.

It will be understood that, as so constructed, the suspension of each road wheel 30 or set of dual road wheels, if so provided, is independent of the others, yet equalization for the tandem axles is achieved. It should be particularly noted that each bellcrank, with its two lever arms, is independently fulcrumed and that there is no common fulcruming connection of lever arms for forward and rearward axles of the tandem arrangement.

Variable rate springs may be used, if desired, to provide good riding qualities when the truck is not under load, yet adequate support and springing for full load. On the other hand, the load-carrying range for any given suspension of the invention is virtually unlimited. It is only necessary to change from one set of springs to another with the proper rate for the load concerned. Nothing more need be done, and the change of springs is easily and conveniently carried out.

It should also be noted that the bracket plates 14 can be predrilled to fit a variety of suspension mountings on existing vehicles, so that a dealer need stock only a minimum number or units.

Figure 11:
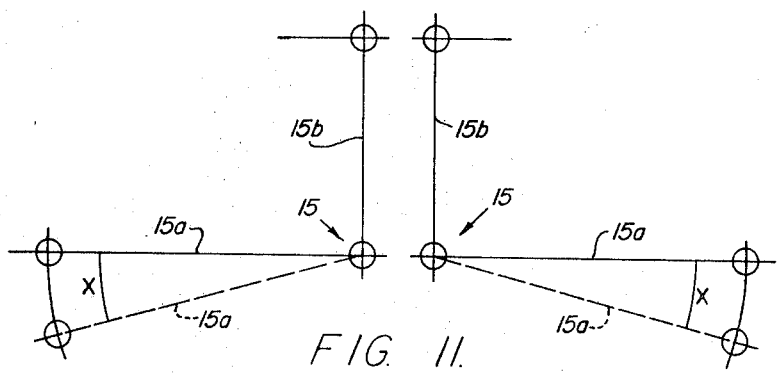
FIG. 11 is a schematic representation of how the self-steering characteristics of the system can be changed.

The ease and convenience of designing suspension units with different degrees of self-steering are illustrated by the diagram of FIG. 11, wherein the individual bellcranks of a set arranged back-to-back at one side of the vehicle are designated as in FIGS. 1–5, and likewise the individual lever arms thereof. The degree of self-steering is dependent upon the size of the angles X when the suspension is under load. It should be noted that self-steering is achieved with complete control of axle parallelism. The angles X remain equal and the axles parallel under normal conditions when the vehicle is traveling along a straight road. On rounding a curve, the angles X become unequal and the axle nonparallel, by reason of self-steering.

Additional standard shock absorbers may or may not be used with the suspension of the invention, as found desirable in particular instances.

Figure 6:
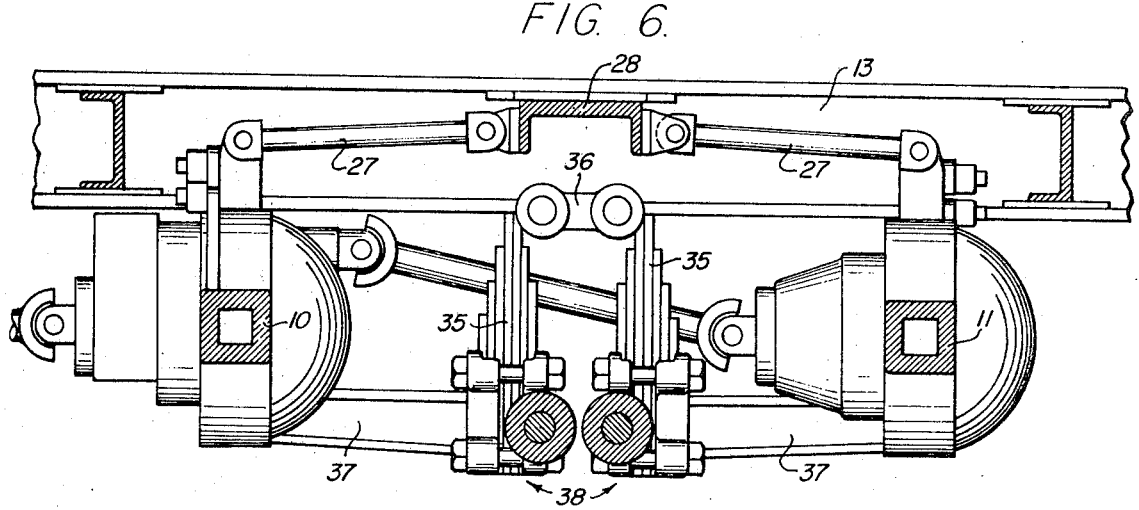
FIGS. 6 and 9 are views corresponding to that of FIG. 3, but showing somewhat different embodiments, respectively, of the invention.
Figure 7:
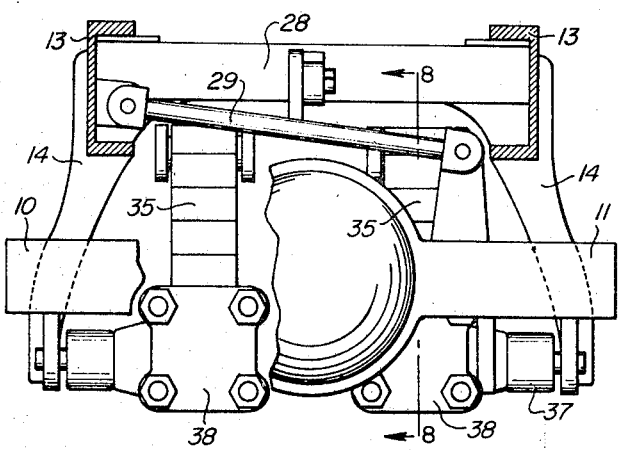
FIGS. 7 and 10 are views corresponding to that of FIG. 4, but showing the embodiments of FIGS. 6 and 9, respectively.
Figure 8:
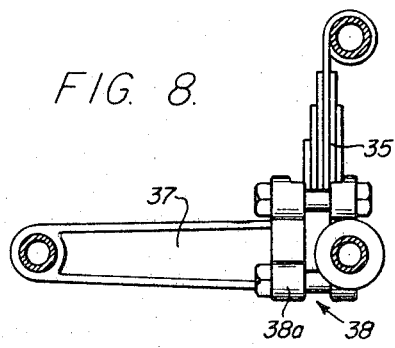
FIG. 8 is a fragmentary vertical section taken on the line 8—8 of FIG. 7, showing only one side of the suspension and leaving out various parts.

The embodiment of FIGS. 6–8 is similar in all respects, except for the use of leaf springs 35, instead of the rigid arms 15b, as the upright lever arms of the several bellcranks. As shown, these are coupled by a rigidly formed link 36. Nevertheless, these could be coupled by resilient means, such as the coil spring assembly of FIGS. 1–5, if there were need for additional springing. The several leaves of each leaf spring 35 are conveniently secured to the other arm 37 of the bellcrank by a clamp arrangement 38 having one of the clamping plates 38a formed rigidly with an end of such arm 37.

Figure 9:
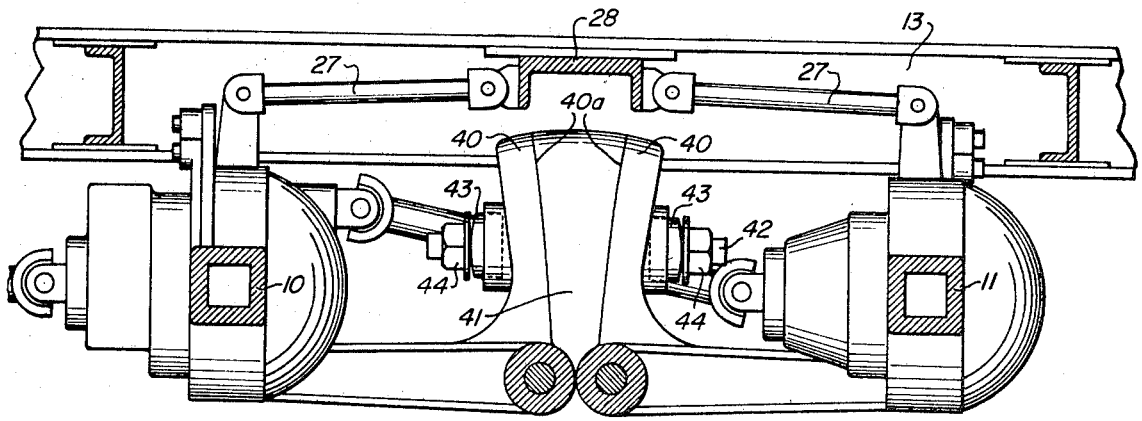
Figure 10:
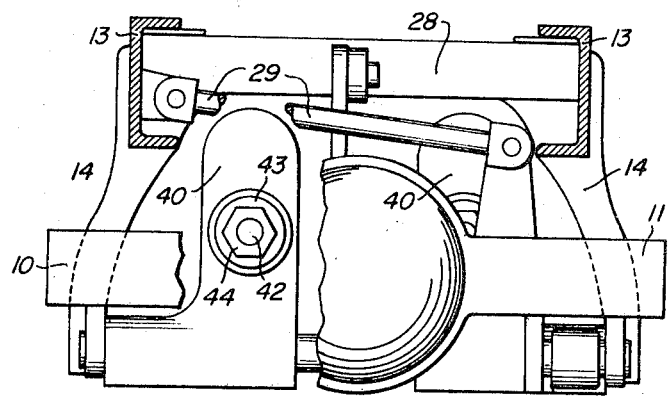

The embodiment of FIGS. 9 and 10 is also similar in all respect, except for the formation of the confronting faces 40a of the corresponding upright lever arms 40 of the bellcranks and the use of a resilient pad arrangement as resilient coupling means instead of the coil spring arrangement of FIGS. 1–5. As shown, the upright lever arm confronting faces 40a diverge outwardly from bottom to top and a conforming main pad 41 of rubber or other suitable resilient material is interposed therebetween, being held by a guide rod 42 which passes freely through the lever arms 40. Auxiliary pads 43 are interposed between the back faces of the respective lever arms and respective washer-nut assemblies 44 that hold them in place on the guide rod.

Whereas this invention is here illustrated and described in detail from the standpoint of presently preferred specific embodiments thereof, it is to be realized that various changes may be made within the generic purview of the disclosure.

I claim:

1. In a suspension system for automotive vehicles having tandem axles, the combination of a pair of bellcranks for each axle, the pairs being mounted back-to-back between the axles and having one set of arms extending outwardly toward the respective axles and a second set of arms extending upwardly;

means adapted to be attached to the frame of the vehicle intermediate the axles for pivoting the bellcranks of said pair intermediate said arms thereof so that each bellcrank can move independently;

respective means for pivoting the ends of the said one set of arms of the pairs of bellcranks to respective end portions of the said axles;

and means coupling corresponding arms of the second set of arms of the pairs of bellcranks, so each of said corresponding arms will react to action by the other corresponding arm of the set, each assembly of corresponding arms and coupling means having shock-absorbing characteristics so as to cushion road shocks.

2. A combination in accordance with claim 1, wherein the shock absorbing characteristics are imparted by at least the coupling means of each assembly.

3. A combination in accordance with claim 2, wherein the arms of each set of corresponding arms terminate in end portions confronting each other and the coupling means are between said end portions.

4. A combination in accordance with claim 3, wherein the coupling means comprise at least one coil for each set of corresponding arms.

5. A combination in accordance with claim 4, wherein the coupling means for each set of corresponding arms also comprise a guide rod pivoted in the confronting end of one of said corresponding arms and passing through the confronting end of the other of said corresponding arms and extending backwardly therefrom, and a coil spring mounted on the backward extension of said guide rod for compression between the end of the rod and the said other of the corresponding arms.

6. A combination in accordance with claim 3, wherein the coupling means for each set of corresponding arms comprise shock pad means.

7. A combination in accordance with claim 1, wherein at least the arms of each assembly of corresponding arms and coupling means are resilient to impart shock-absorbing characteristics to the assembly.

8. A combination in accordance with claim 7, wherein the arms of each assembly of corresponding arms and coupling means are formed as multiple-leaf springs.

9. A combination in accordance with claim 1, wherein the means adapted to be attached to the frame of the vehicle are a pair of bracket plates predrilled for various standard mountings.

10. In a suspension system for automotive vehicles having tandem axles, the combination of bellcrank means for each end of each of the axles;

means for pivotally attaching the intermediate portions of said bellcrank means to the frame of the vehicle to serve as fulcrums;

means for pivotally attaching the ends of one set of arms of said bellcrank means to respective axle end portions; and means articulatively coupling pairs of opposing arms of the other set of arms of said bellcrank means to each other, each assembly of coupled arms of said bellcrank means and coupling means having shock-absorbing characteristics so as to cushion road shocks.

* * * * *